United States Patent Office 3,704,148
Patented Nov. 28, 1972

3,704,148
ADHESIVE FOR WATER-RESISTANT CORRUGATED PAPERBOARD BONDS
Roy E. Wright, Berkeley, Calif. (5679 Merriwood Drive, Oakland, Calif. 94611), and Joseph Vastag, 901 Grayson St., Berkeley, Calif. 94710
No Drawing. Continuation-in-part of abandoned application Ser. No. 871,536, Nov. 17, 1969, which is a continuation of application Ser. No. 511,359, Dec. 3, 1965. This application Nov. 5, 1970, Ser. No. 87,351
Int. Cl. C09j 1/02, 3/24
U.S. Cl. 106—79     5 Claims

ABSTRACT OF THE DISCLOSURE

This invention is an improvement in the art of water-resistant adhesives used in the manufacture of corrugated paperboard. These adhesives are composed of soluble silicates, soluble blood protein, and a small amount of a simple dialdehyde which controls the gelation temperature of the adhesive between about 37° and 55° C.

RELATED CASE

This application is a continuation-in-part of 871,536 filed Nov. 17, 1969, now abandoned and which was in turn a continuation of 511,359, filed December 3, 1965, now abandoned.

THE NEED

There is a demonstrated need for an adhesive for bonding corrugated paper which has a greater wet bond strength and wet fiber tear than those adhesives presently available. This new formulation must set at lower temperatures to be useful at machine speeds above 400 f.p.m. At the same time the cost for the adhesive must be in the same range or lower. It must have a long pot life, greater than 72 hours at room temperature and several hours at glue pan temperatures. It must have easy-cleanup properties and the finished board must have a good dry bond strength and dry fiber tear. The adhesive must have approximately constant viscosity over the time and temperature range of application and not exhibit glue line migration or staining. The adhesive itself should be available in either liquid form or in the dry mixture.

The inability to control the gelation temperature of the adhesive has been a real drawback in the development of adhesives for corrugating purposes. If the gelation temperature is too low, the adhesive tends to set up in the adhesive pan into which the applicator roll dips. This is because in the corrugating practice a great deal of heat is used and it is impossible without special apparatus to keep the temperature of the adhesive in the glue pan at an ordinary ambient level. Also in setting the adhesive after it is placed on the paperboard, considerable heat is required to complete the gelation of the adhesive. If the gelation temperature is too high, excessive heat is required which is not only expensive but also may affect the paperboard itself. It thus becomes necessary to control the gelation temperature of the adhesive depending on the machine temperature, and with our new adhesive composition the gelation temperature can be changed to meet the requirements at the singlefacer and the doublebacker glue lines. Conditions at these two glue lines are well known to be different and in many cases different compositions are applied in the two glue pans. It is fairly obvious that this gelation temperature will have an important effect on the time of set of the adhesive in the bond which, again, will affect the speed at which the machine may be run and thus affect the overall economy of the operation.

The ordinary plywood adhesives form poor paper-to-paper bonds in corrugating use because of their high consistency, the free alkali content and rapid degradation. They also tend to have a low gelation temperature which would bring about setting in the glue pan.

In general, it is recognized that the blood proteins, which cost half as much as undenatured vegetable proteins, are the least expensive form of protein as they are a by-product of the meat packers. They also have been much more difficult to handle primarily because of poor glue line quality and the low gelation temperature. However, by careful study and innovation we have found satisfactory compositions which form dry bonds of very good strength and fiber tear characteristics as well as much stronger wet bonds than had previously been possible with even the silicate-vegetable protein adhesives. These compositions have very stable viscosities with a long pot life of over a month and may be used at temperatures in the glue pan above 38° C. The gelation temperature of the improved glue can be adjusted to a gel temperature between 40° C. and 60° C. and the systems are free of caustic soda which is developed in glues which contain lime or to which free caustic is added.

Undenatured or unhydrolyzed isolated vegetable seed protein adhesives made with sodium silicate will set without heat, which is an advantage in some applications. However, the vegetable seed proteins and the animal blood proteins are not by any means identical nor can one be used as a direct substitute for the other. Their gelation characteristics and setting characteristics are sufficiently different that completely new formulations and combinations were required before an adhesive satisfactory for use in the paper laminating processes was developed.

Starch adhesives, fortified with synthetic resins, such as urea formaldehyde, have inadequate set bond strength and usually operate at reduced machine speeds to achieve acceptable bond quality. Formaldehyde odor released during glue bond setting is objectionable. Starch-resin mixes made on the acid side are corrosive to metal parts, have the undesirable formaldehyde odor, and require difficult and expensive cleanup operations when a switch is made to ordinary adhesives.

OUR INVENTION

Our invention is an adhesive for forming corrugated paperboard with improved wet strength, excellent dry bond strength, a pot life in excess of one month, lacking free alkali to cause staining, having a controllable gelation temperature and yet setting rapidly, non-hydrolyzing or putrifying to form undenatured protein and more economical than water-resistant corrugating adhesives formed with undenatured soy protein or starch-ureaformaldehyde.

This new adhesive is composed of approximately equal parts by weight of soluble silicate and soluble spray dried blood. The soluble spray dried blood is preferably hog or beef blood, or a mixture thereof, but may include sheep or fowl blood which are less expensive. Hog blood has the advantage of producing low viscosity, with somewhat better stability than beef blood. Beef blood gives body to the glue and increases the amount of water which can be used. Choice of blood is primarily a matter of cost and availability since either type or any combination of the two can be satisfactorily used.

In the absence of soluble silicate, blood protein at similar concentration in water has very low initial viscosity and a higher gel temperature. Increasing the soluble silicate content increases the strength of the wet and dry bonds; at the same time it stabilizes the viscosity of the adhesive. Adding NaOH lowers the bond strength and increases the viscosity and promotes free alkali which tends to stain paperboard in humid atmospheres. Too high a soluble silicate content reduces the bond strength and increases the pH above about 11.0.

We have found that in general the pH of these compositions should range from about 9.9 to 11.4. Generally, if the pH is lower than about 9.9 there is a tendency for gelation of the silica. This will, of course, vary with the type of alkali silicate used. On the other hand, if the pH is much above 11.4, we find that the blood tends to hydrolyze and rapid gelation will occur. Again, this will vary with the blood, or blood mixture used.

Alkali silicate.—For use in this invention, the ordinary soluble alkali silicates of commerce are applicable over a wide range of ratio of alkali to silica. For instance, we have found that we can use sodium silicates with a molecular ratio of $SiO_2$ to $Na_2O$ ranging from about 1 to 4 but a range of 2.4 to 3.8 is more satisfactory, and 3.0 to 3.5 is preferred. We have made some experiments with NaOH without the addition of ionic silica. We believe that over a very narrow range of concentration and/or pH a satisfactory bond can be formed but that control is difficult and such adhesives are unlikely to be very satisfactory for general commercial use. The potassium silicates may be used over a similar range of ratio and lithium silicates may be used up to a somewhat more siliceous ratio such as 8.

We may use a range of ratios of commercial alkali silicate solution to dried blood depending somewhat on the ratio and alkali present in the alkali silicate and also on the type of blood, or blood mixture, used. For instance, with a sodium silicate having a ratio of about 3.2 $SiO_2$ to 1 of $Na_2O$ (e.g. N sodium silicate manufactured by the Philadelphia Quartz Co.) we have found the ratio of 3 parts by weight of sodium silicate to 5 parts by weight of beef blood up to a ratio of 7 parts of alkali silicate to 5 parts of beef blood will result in very satisfactory corrugating adhesives.

The alkali silicate is introduced into the aqueous reaction medium no later than the time that any interreaction between the blood and the dialdehyde starts.

Soluble blood.—Soluble blood protein is necessary. In general, we prefer not to use fresh blood, but dry blood which is more than about 65% soluble has been satisfactory. We may use 100% hog blood, 100% beef blood, or any mixture of the two. We also may use sheep blood or fowl blood either alone or in a mixture. In any case it would be necessary to work out slight variations in the formula to balance variations in the blood protein, e.g. whole blood or defibrinated.

Although partially soluble blood (15–85% soluble) may be used, a highly soluble blood is preferred. This should have a solubility of at least 65% and is preferred to have a solubility above about 85%. The use of hog blood requires less alkali silicate solution than beef blood. Hog blood also is much improved by the addition of starch. In this case two parts of blood to one part of starch seems to be necessary to give initial tack. When only beef blood is used, about 4 parts of blood to 3 parts of starch will give the proper initial task. Sheep blood appears to be intermediate between beef and hog blood, and fowl blood is considered to be similar to hog blood. The hog blood is also preferred because it tends to control the viscosity. It has a longer pot life and a shorter initial mixing time. Beef blood reacts more slowly, is more complex, and needs more alkali.

The viscosity of our adhesives formed with blood protein preferably ranges from 200 to 2000 cps. which is much lower than the normal silicate-vegetable protein adhesives. These blood-protein-silicate adhesives are also smoother and the wet and dry bonds are normally improved. The blood-protein-silicate mixtures may be made as either wet or dry formulations.

Dialdehyde.—Only a small amount of a simple dialdehyde is needed to form good corrugating adhesives. For instance, we have used satisfactorily a range of 0.5 to 11 milliliters of a 40% glyoxal solution based on 100 parts by weight of soluble dried blood. Similar, but somewhat varied, ratios will be found applicable for other types of blood or mixtures of blood. A simple dialdehyde is an essential component of this adhesive as it has multiple effects. Dialdehydes rapidly raise the viscosity to a useful level and maintain the viscosity in this useful range for two or more weeks. Bond quality of board made from glues one hour old is good, and glues held one to seven days or more before use will still produce similar good quality bonds. The dry and wet bond strengths are improved as well as the fiber tear. The gelation temperature for a comparable sodium silicate-blood-water mixture without glyoxal is about 35° C. For unhydrolyzed isolated soy protein silicate adhesives, the gelation temperature is about 62° C. Starch adhesives also have a gelation temperature of about 82° C. Surprisingly, the combination of the soluble alkali silicate with dialdehyde in forming blood protein adhesives raises the gelation temperature significantly above about 35° C. to a range of about 35° C. to 60° C. It is now possible to control the gelation temperature of the adhesive over a considerable range and adjust the gelation temperature according to the speed and other conditions of the machine. In high speed operation, hotter plates are required to set a normal adhesive unless the gelation temperature may be reduced so that less heat is required. Therefore, with our new adhesive it is possible to adjust to a minimum gelation temperature for high speed, or a maximum gelation temperature to obtain the necessary glue pan stability. It is possible to adjust the adhesive to the optimum gelation temperature for the desired machine conditions.

Simple aliphatic dialdehydes (e.g. glyoxal and glutaraldehyde) are preferred for this combination. Other more complex aldehydes tend to form formaldehyde which is too strong and forms a gel and prevents the extension of pot life. Glyoxal (or ethanedial) is a highly reactive aldehyde which forms stable hydrates, reduces Tollens' reagent, adds two molecules of sodium bisulfate, and forms a double acetal. Sodium hydroxide solution even at room temperature converts glyoxal into the sodium salt of hydroxy acetic acid (glycolic acid) by undergoing a reaction in which one aldehyde unit is oxidized and the other reduced.

Other additives.—The advantage of adding raw or ungelatinized starch is that it gives the adhesive better initial grab and initial set; that is, the adhesive has a fast set with fiber tear, and it also adds the proper consistency so that the adherend picks up the right amount of glue from the glue roll. The presence of starch develops a more elastic or less brittle bond. While milo starch has been generally used, other forms of starch are satisfactory, such as potato starch, tapioca starch, or wheat starch; that is, any form of vegetable carbohydrate. In general, we have found 20 to 80 parts by weight of starch will form satistory bonds with 50 to 60 parts by weight preferred.

We have found that the addition of a very small amount of thiourea sometimes improves the wet strength. This depends primarily on the blood albumin used and it may, or may not, be included.

Organic sulfur compounds, such as $CS_2$ and thiourea, stabilize blood glues against hydrolysis and prolong the useful life. Lower alcohols and ketones actively denature blood protein.

Addition of thiourea to the glue will increase dry bond strength up to 20° and will bring the quality of a bond using beef blood up to that of hog blood.

We would usually prefer to add an antifoaming agent and an antioxidant. These may be combined into one type such as the FA #5 sold by Westport Chemical Co. or Defomex types 576, 10–606, 10–619, 10–620, 10–621, 10–622, and 10–623 also sold by the same chemical company. On the other hand, pine oil or one of the silicones or a silicone defoaming agent or a higher alcohol may be used along with an antioxidant, e.g. sodium thiosulfite. The use of an antifoaming agent, such as FA #5 in the range of 0.5 to 1.0 ml. per 100 g. of blood, will reduce foaming satisfactorily. A similar amount of pipe oil with about 3.0 g. of sodium nitrate also may be used. These proportions are based on the weight of the blood.

Sodium sulfite also is effective in controlling or reversing the viscosity increase with time so that bonds of equal may be made after one hour, one day, or a week.

If desired, 1-5% of pentachlorophenol or similar conventional inhibitors may be added to the wet mixture to prevent the degradation of the protein by bacteria, molds or enzymes.

Various fillers are possible. Kaolin clay is generally used in restricted amounts as it builds consistency in the adhesives, improves bond strength, and controls the glue penetration. Feather meal, which is 85% protein, has a low solubility and if ground sufficiently fine makes a good filler, replacing starch and clay. Hydrolyzed feather meal is preferred.

We have used satisfactorily 10 to 60 parts by weight of a clay, such as a kaolin clay, but we prefer to use 20 to 30 parts along with a preferred amount of starch. It is also possible to add additional clay to correct the viscosity of the finished glue. The weights given are based on 100 parts by weight of the soluble dried blood.

Other fillers suggested are wood flour, bentonite, corn cobs and by-products of the distillation of furfural, such as Furafil sold by Quaker Oats Co., diatomaceous earth, hydrolyzed cellulose, and ground nut shells, etc.

Our composition will preferably range from:

| | Percent |
|---|---|
| Water-soluble dried blood | 13 to 14 |
| Sodium silicate | 15-17 |
| Dialdehyde (6% solution) | 1-4 |
| Ungelatinized starch | 7-9 |
| Filler (e.g. kaolin clay) | 4-7 |
| Antioxidant (e.g. $Na_2SO_3$) | 0.2-0.3 |
| Preservative (e.g. pentachlorophenol) | 0.1-0.4 |
| Defoamer (e.g. pine oil, etc.) | 0-0.04 |
| Thiourea | 0-0.2 |
| Water | 54-57 |

TESTING

A common specification for water-resistant paperboard requires that a test piece of combined board having dimensions of 10 x 6 inches and a thickness of 0.1 inch absorb no more than 50% by weight of water upon immersion at a temperature of 26.7° C. for a period of two hours; the Mullen test after immersion being not less than 200 when measured two inches from the edge. The specification further requires that any separation of the plies caused by an immersion of one hour must not exceed two inches at any point.

Measurement of fiber tear, a rough check upon the strength of bond, used by all plant operators, consists merely in pulling glued corrugated board apart at the glue lines and noting whether paper plies (liner and medium) separate cleanly or whether the glue bond is stronger than the paper in which case the surface layer of at least one part of one component is torn off and remains attached to the other paper ply by the adhesive bond. The proportional area over which the adhesive bond produces fiber tear in the adjacent ply is taken as a measure of the bond strength.

The actual bond strengths are obtained by a standard test procedure in which sections are cut from the singleface corrugated board having dimensions of 3 inches by 3⅜ inches with 13 flute tips exposed across the face of the B-flute singleface board samples. Sections are also cut from 42 or 90 lb. linerboard with dimensions of 3 inches by 3¼ inches. A film of the adhesive to be tested is applied to a glass plate in a thickness of 0.012 inch. The singleface board is then placed flute tips down on the glue film so that the film will be picked up on the flute tips. The board should not slip or slide on the glue. Contact is made for a period of less than 3 seconds. The glue coated face of the corrugated board is then applied to the face of the linerboard and pressed against it with a block weighing 1,282 grams for 5 minutes to produce a cold set bond. To produce a hot set bond, the procedure is the same except that the combination is heated on a hotplate for 20 seconds at 325° F. while the 1,282 gram weight is resting on it. After the bond has been produced, the combined board is allowed to cure at room temperature for at least one hour or more before testing. Test sections having dimensions of ¾" by 13 flue tips long are cut from the center sections of the bonded samples, the cuts being clean and sharp. Sections for the wet bond test are then completely immersed in 20° C. water for 24 hours, removed and tested while wet. Dry bond strengths are measured on a split jaw Scott tester where steel teeth fit into the openings of the test sections. Force applied to one jaw puts the glue bond under increasing tension until rupture takes place. Dry bond strength is measured after curing for 16-24 hours and is expressed in pounds required to rupture a glue line 13 flute tips long by ¾ inch wide, making 9¾ inches of glue line, unless otherwise indicated. Wet bond strength was similarly tested with a Chatillon spring scale. An indication of glue line quality is given by the amount of paper fiber torn during test procedures. This is estimated and expressed as a percent failure (the inches of glue line showing fiber tear divided by the total glue line length of the sample.

The gelation temperature was determined by placing 200 grams of the final glue mixture in a 250 cc. beaker held in a water bath controlled at about 32° C. The temperature was allowed to rise at about 0.55° C. per minute. The glue was stirred constantly to maintain uniform heat transmission. The gelation temperature was evident as the point at which the temperature rise halted for at least a minute.

It is known that the soluble silicates and soluble albumin react to form a complex compound of unknown composition. It is also known that the simple dialdehydes will react both with the protein and the silicate so that the final bond will contain a very complex chemical composition. Because of these intricate reactions, it is understandable that the order of addition of the components and the time allowed for the reaction after the addition of each of these reactive components will be important. We have followed the practice of preparing these formulas by mixing as follows: In the nine-tenths of the total water to be used, add sodium sulfite, thiourea and antifoamer with agitation until the solids are dissolved. Then add the blood component and agitate for 5 minutes. Next add the starch component and agitate for 5 more minutes. After that, add the clay and agitate for 5 minutes. Next, add the sodium silicate and use the rest of the water to rinse the container. Agitation for at least 15 minutes and, finally, add the dialdehyde and agitate for another 15 minutes. If this procedure is followed, the viscosity will stay within the required limits for at least several days and the initial viscosity will be reproducible. Dry bond and wet bond results are also good under these conditions. However, under some conditions it may be necessary to use very short intervals between the addition of the components, and the glues can be used with satisfactory bond performance but the viscosity will not remain within the preferred range for as long a period. For instance, simultaneous addition of silicate and dialdehyde results in higher viscosity.

In the examples, the type A blood was soluble whole beef blood obtained from Pacific Adhesives Co. Inc. of Hillsboro, Oreg. Type 2 H (a highly soluble hog blood) and Type 2 (a highly soluble beef blood) were obtained from James Allan & Sons of San Francisco. Type A blood is about 64% soluble and it is spray dried with a moisture content of about 1.5%.

FA #5 is a combined antifoaming and antioxidizing agent from Westport Chemical Co. Hydrite R Clay is anhydrous low grit kaolin clay from Georgia Kaolin Co. Globe 4001 Starch is a raw, ungelatinized milo starch obtained from Corn Products Company.

N Sodium Silicate, sold by the Philadelphia Quartz Company, contains 8.9% $SiO_2$ at a weight ratio of 3.22 $SiO_2$ to $Na_2O$.

Example 1

In the following example, varying amounts of glyoxal were added to a base composition of adhesive. At the same time the amount of water was varied in order to control the viscosity within the same range so that the gelation temperatures would be comparable.

Following the above mixing procedure and using the above test methods, we prepared the adhesives of Table I and determined the gelation temperatures there listed. The glyoxal was added as a 6% solution in water. The mixed dried blood was one-fifth hog blood, Type 2H, and four-fifths beef blood, Type 2. It is thus shown that the gelation temperature can be controlled over a considerable range in temperature by controlling the amount of glyoxal added. This may be varied also by changing the proportion of beef and hog blood. In one series of tests using the same adhesive formula, but varying the blood additive, the gelation temperature was 42° C. with 100% dried beef blood and about 43° C. using 100% dried hog blood, but was only 40° C. using 80% beef blood and 20% hog blood. These adhesives all had a pH of 10.8 and a pot life at 38° C. of 46 minutes for the mixture, 50 minutes for the dried hog blood and 53 minutes for the dried beef blood.

It was also found that a similar adhesive, a mixed blood adhesive, had a higher gelation temperature after aging for 9 days. At this time the gel temperature was nearly 45° C. and the pot life at 38° C. was approximately 8 hours. With 100% hog blood the gelation temperature after 22 days was about 51° C. The actual pot life at 38° C. was not determined but it was much improved as a similar composition with a small amount of beef blood at 9 days age had a gelation temperature of about 48° C. and a pot life at 43° C. of 4¾ hours.

TABLE I

| Composition, percent | A | B | C | D | E |
|---|---|---|---|---|---|
| Glyoxal (anhydrous basis) | 0.03 | 0.06 | 0.09 | 0.12 | 0.14 |
| Sodium silicate ("N") | 15.4 | 15.1 | 14.8 | 14.4 | 13.9 |
| Dry soluble blood (mixed) (½ type 2H hog blood) (½ type 2 beef blood) | 15.1 | 14.9 | 14.6 | 14.2 | 13.7 |
| Milo starch (Globe 4001) | 7.8 | 7.6 | 7.5 | 7.3 | 7.05 |
| Clay (kaolin) (hydrite R) | 6.2 | 6.1 | 6.0 | 5.8 | 5.63 |
| Thiourea | 0.22 | 0.22 | 0.22 | 0.21 | 0.21 |
| $Na_2SO_3$ | 0.22 | 0.22 | 0.22 | 0.21 | 0.21 |
| Antiform and antioxidant (FA #5) | 0.11 | 0.11 | 0.11 | 0.11 | 0.10 |
| $H_2O$ | 55.0 | 55.7 | 56.5 | 57.7 | 59.1 |
| Total | 100.0 | 100.0 | 100.0 | 100.0 | 100.0 |
| Gelation temperature, ° C.: | | | | | |
| 1.5 hours | 37 | 39 | 41 | 44 | 47 |
| 24 hours | 40 | 43 | 44 | 48 | 51 |

Example 2

In this example we have compared the effect of changing the ratio of silica to alkali in the alkali silicate and find that at higher silica ratios the gel temperature seems to be increased but at the same time the brittleness of the glue joint increases. On the other hand, the more alkaline silicates (that is the alkali silicates with a high proportion of $Na_2O$ to $SiO_2$) tend to have a low gelation temperature and are so alkaline that the proportion of silicate has to be reduced to prevent rapid gelation.

When NaOH is used without silica, 5 parts by weight in the "standard" adhesive composition of Table II will cause rapid coagulation, while 2 parts by weight of NaOH will result in a bond with very much reduced strength.

We have also found that when an intermediate sodium silicate ratio, such as the 3.22 ratio material (N) is used as the alkali we find good bonds formed with 100 to 120 parts of the silicate to 100 parts of dried beef blood. At 140 parts of the 3.22 ratio silicate, a fairly good bond is obtained but there is a reduction in both strength and tear. With only 60 parts of the silicate, the bond is again much poorer and the viscosity of the mixture is quite high. With 80 parts, the strength of the wet bond is still good but the dry bond is somewhat deteriorated. In general, with 3.22 ratio sodium silicate used, in the formula of Table II, the best viscosity range was obtained with 14.4 to 16.1% of the silicate. The corresponding pH range was 10.85 to 10.95. It is well known that viscosity of protein compositions is affected by the amount and vigor of the mixing operation.

TABLE II

| | Ratio of $SiO_2$ to $Na_2O$ (by weight) | | | | |
|---|---|---|---|---|---|
| Composition (percent) | 3.75 | ¹ 3.22 | 2.90 | 2.00 | 1.80 |
| Glyoxal (anhydrous basis) | 0.09 | 0.09 | 0.10 | 0.10 | 0.11 |
| Sodium silicate (liquid) | 15.5 | 15.5 | 15.4 | 12.8 | 10.6 |
| Dry blood: | | | | | |
| Type 2 beef | 10.4 | 10.4 | 10.4 | 10.7 | 11.0 |
| Type 2H hog | 2.6 | 2.6 | 2.6 | 2.7 | 2.75 |
| Milo starch (Globe 4001) | 8.6 | 8.6 | 8.6 | 8.8 | 9.1 |
| Clay (kaolin) (hydrite R) | 5.9 | 5.9 | 5.9 | 6.1 | 6.25 |
| Thiourea | 0.2 | 0.2 | 0.2 | 0.2 | 0.21 |
| $Na_2SO_3$ | 0.22 | 0.22 | 0.22 | 0.23 | 0.23 |
| Antifoamer (FA #5) | 0.11 | 9.11 | 0.11 | 0.12 | 0.12 |
| Water | 56.4 | 56.4 | 56.4 | 58.4 | 59.7 |
| Total | 100.0 | 100.0 | 100.0 | 100.1 | 100.1 |
| pH | 10.85 | | 10.95 | 11.30 | 11.15 |
| Gelatin temperature, ° C.: | | | | | |
| 1.5 hours | 44 | 41 | 41 | 38 | 38 |
| 4 hours | 45 | 42 | 42 | 37 | 40 |
| Viscosity (cps.): | | | | | |
| 1 hour | 1,120 | 1,240 | 830 | 1,980 | 1,220 |
| 24 hours | 1,980 | | 4,940 | Gel | 16,500 |
| Dry bond (pounds) | 37 | 78 | 73 | 67 | 54 |
| Dry tear (percent) | 1 | 85 | 20 | 20 | 50 |
| Wet bond (pounds) | 9 | 12 | 9 | 4 | 9 |
| Wet tear (percent) | 100 | 90 | 100 | 5 | 100 |

¹ This composition is considered a "standard."

Example 3

In this example the soluble dried blood was permitted to hydrolyze until the color changed from brownish red to light red. By this process it was possible to increase the gelation temperature to about 56° C.

The adhesive was prepared with 50–60 cc.'s of water, 0.22 grams of sodium sulfite, 0.1 cc.'s of the defoamer FA #5, 6.8 grams of Type 2 beef blood and 6.8 grams of Type 2H hog blood. 8.2 grams of starch and 5.95 grams of clay were added as fillers. This mixture was allowed to stand for 24 hours until the color was light red. Then 15.2 grams of the 3.2 ratio sodium silicate (N) was added and 4.0 grams of 6% glyoxal solution.

This adhesive composition had a viscosity of 2,000 cps. at one hour and it increased to only 2350 cps. in 8 days. The gelation temperature was 56° C. and the pH was 10.8. Very good bonds were formed. The dry bond strength was 72 pounds with 98% fiber tear and the wet bond strength was 11 pounds with 98% fiber tear.

It is also possible to increase the gelation temperature by the use of furfural instead of glyoxal. Gelation temperatures as high as 72 to 74° C. have been observed but, in general, either the strength properties or the viscosity characteristics have suffered.

Other aldehydes, such as alpha hydroxdialdehyde, sodium formaldehyde bisulfite and tris(hydroxymethyl) nitromethane were tried in place of the simple aliphatic dialdehyde with rather unsatisfactory results. The gelation temperature was generally low and the viscosity control was poor. Thus the simple dialdehydes, e.g. glyoxal and glutaraldehyde, have characteristics which are specifically useful in the silicate-blood albumin combination.

Example 4

Experiments using soluble hog blood designated 2H showed that glues with good wet and dry bonds could be obtained with better viscosity control and higher fiber tear than when using a Type A beef blood. The blood-silicate-glyoxal adhesives made with the beef blood Type A and those made with the hog blood Type 2H were found to have gelling temperatures of 48° C., while a regular starch adhesive has a gelling temperature of about 82° C., and a silicate-protein adhesive made with undenatured soy bean protein had a gelling temperature of 52° C. These adhesives were all at viscosities such as might be used for corrugating board. When used in the preparation of corrugated board, the hog blood adhesive had poor dry bonds with low fiber tear and insignificant wet bonds with no fiber tear when set at 66° C. However, at 93° C. good bonds and good fiber tear were obtained. With the silicate-undenatured soy protein adhesive poor dry bonds and low fiber tear with insignificant wet bond strength and no fiber tear were obtained at 93° C. At 121° C. the dry bond strength and tear was good, but the wet bond and fiber tear were both poor even at 135° C. It is thus obvious that the blood glues required lower temperatures to develop good bonds. This is in line with the relative gelation temperatures of the two adhesives.

When the hog blood and beef blood were mixed, the initial viscosity increased with increasing proportions of the hog blood.

In the following Table III are shown compositions prepared with 100% beef blood and 100% hog blood and an intermediate composition with 50% of each. Glyoxal was varied slightly in order to control the viscosity within useful ranges. Good bonds were obtained in all cases. The adhesive made with 100% hog blood was tested after 22 days. The viscosity was still about 1200 centipoises and the bonds were approximately the same.

The linerboard used was 90 lb. weight, well-sized but not of a waterproof grade. When waterproofed 90 lb. board was used the initial and wet bond strengths increased but the fiber tear decreased. For instance, the dry bond strength went up to 70 lbs. with a fiber tear of 60% whereas the wet bond strength increased to 10 lbs. with a fiber tear of only 10%.

TABLE III

| Component | 100% beef blood | 50% of each | 100% hog blood |
|---|---|---|---|
| Glyoxal (6% solution) | 1.9 | 1.7 | 1.7 |
| Sodium silicate (N) | 15.60 | 15.10 | 14.7 |
| Dry blood: | | | |
| Beef (type 2) | 12.65 | 6.80 | |
| Hog (type 2H) | | 6.80 | 14.5 |
| Milo starch (Globe 4001) | 8.75 | 8.20 | 7.5 |
| Clay (kaolin) (hydrite R) | 5.85 | 5.95 | 6.0 |
| Thiourea | 0.22 | 0.11 | 0.0 |
| Na₂SO₃ | 0.22 | 0.22 | 0.22 |
| Antifoam (FA #5) | 0.11 | 0.11 | 0.11 |
| Water | 54.7 | 55.0 | 55.3 |
| Total | 100.0 | 100.0 | 100.0 |
| Gelation temperature, °C | 42 | 40 | 43 |
| Viscosity (CP.S): | | | |
| 15 minutes | 660 | 780 | 1,720 |
| 24 hours | 1,700 | 1,870 | 1,260 |
| Bond strength (pounds): | | | |
| Dry | 60.6 | 63.2 | 54.4 |
| Wet | 6.3 | 6.3 | 5.2 |
| Fiber tear (percent): | | | |
| Dry | 98.7 | 99.8 | 97.0 |
| Wet | 98.1 | 99.8 | 100.0 |

Example 5

While these adhesives may be prepared and used over a period of about a month or more it is advantageous to have dry mixes prepared to which only water or the liquid components need be added. Thus we have mixed the dry components together, both with and without the sodium silicate. When properly mixed, a liquid sodium silicate may be mulled into the form of a stable dry mixture but the glyoxal in these combinations, especially in the presence of moisture, tends to react and it is usually better to add the glyoxal with the water or water and soluble silicate when the adhesive solution is made up.

We prepared a composition with 5.9% of kaolin clay, 8.6% of raw milo starch, 10.4% of Type 2 soluble dried beef blood, 2.6% of Type 2H soluble dried hog blood, 0.11% of antifoam FA #5 and 0.22% of Na₂SO₃. This dry mixture was later formed into a smooth glue by the addition of 55.2% water, 15.4% of N sodium silicate and 1.5% of 6% glyoxal.

This adhesive solution had a higher viscosity than the glue of the same composition prepared wet. Boards made with the adhesive solution were good having a dry bond strength of about 52 lbs. with 95% fiber tear and a wet bond strength of 10 lbs. with about 95% fiber tear. After the dry mixture had aged for 50 days the solution was made up with the addition of water, soluble silicate, and glyoxal. Bonds made with this composition had 70 lbs. dry bond strength with 100% fiber tear and 10 lbs. wet bond strength and 95% fiber tear. If the glyoxal was added to the initial dry mix, it tended to react in an undesirable way and the viscosity increased rapidly and the mixture became too thick within 24 hours.

Example 6

Other dry mixtures were made using powdered sodium silicates. The very alkaline silicates, such as those of the sodium metasilicate ratio or more alkaline tended to cause gelation when the water was mixed in. A composition with 7.5% of G sodium silicate (19.2% Na₂O and a weight ratio of 3.22 SiO₂/Na₂O, sold by the Philadelphia Quartz Co.), 9.44% of Type 2 soluble dried beef blood, 4.75% of Type 2H soluble hog blood, 6.36% of kaolin clay (Hydrite R), 0.25% of Na₂SO₃ and 0.25% of antifoaming agent (Defomex 10–606) and 9.35% of raw milo starch, was prepared. To this dry mixture was added water to which glyoxal had been added so that the final composition contained 0.14% of glyoxal (anhydrous) and 62% of water.

This composition when tested formed a very smooth glue which had a viscosity of 1190 centipoises at 1 hour and 3550 centipoises at 24 hours. The dry bond strength was 66 pounds with 95% fiber tear and the wet bond strength was 11 pounds with 100% fiber tear.

Example 7

In another test the following adhesive was prepared with 0.11% glyoxal (anhydrous), 15.36% of N sodium silicate, 10.34% of Type 2 beef blood, 2.59% of Type 2H hog blood, 8.55% of raw milo starch, 5.87% of kaolin clay, 0.11% of antifoamer FA #5, 0.22% of Na₂SO₃, 0.19% of thiourea, and 56.67% of water. This adhesive had a viscosity of 1040 centipoises at 15 minutes and 1380 centipoises at 1 hour. Very little change was noted in 3 hours. A commercial plant scale run was made using conventional corrugating machinery, and salable corrugated board was produced. When operating at speeds as high as 400 f.p.m. on the singleface and doublewall stations board produced had excellent wet and dry bonds.

Example 8

In this example the glyoxal content was increased slightly. In this adhesive there was:

0.15% of glyoxal (anhydrous)
0.22% of Na₂SO₃

0.11% of antifoam FA #5
10.4% of dried beef blood Type 2
2.6% of dried hog blood Type 2H
8.6% of raw milo starch
5.9% of kaolin clay
15.35% of sodium silicate (N)
56.57% of water This had an initial viscosity of about 740 centipoises and about 2000 cps. after about 24 hours. The gelation temperature was about 52° C. and the pH about 10.65.

A commercial plant scale test was made using this adhesive on the doubleback station. Paper components were 42 lbs. doubleback linerboard and 35 lbs. corrugated medium. Glue roll clearance at the doubleback station was 0.012 inch. Corrugated board with very good dry and wet doubleback bond was made at speeds up to 300 f.p.m.

Example 9

An adhesive, similar to Example 8, was prepared for laminating paper to wood. In this test 15.1% of N sodium silicate was mixed with 10.2% of beef blood Type 2 and 2.6% of hog blood Type 2H, 0.15% anhydrous glyoxal, 14.8% of feather meal, 0.22% of $Na_2SO_3$ and 0.11% of defoamer FA #5. In one hour the viscosity was about 3200 centipoises.

A small scale test using this adhesive was made on standard production equipment which was making paper-wood veneer-paper laminates. Adhesives was spread on both sides of a 12 inch x 12 inch piece of veneer. This was butted up against an 84 inch x 12 inch veneer section spread with unhydrolyzed isolated soy protein-silicate glue. The combined 96 inch x 12 inch veneer sections were laid up between paper liners and pressed at 125–175 p.s.i. and 177° C. for about 12 seconds. This is normal operational procedure. The feather meal prevented the penetration of the adhesive into the veneer and retained the moisture in the glue line while the glue line was open to the air. There was no glue line failure when samples were tested for both dry and wet delamination.

Other tests were made using starch and clay instead of the feather meal with very satisfactory results. Both dry and wet fiber tear were 100%. When using these glues to bond two pieces of wood veneer in the laboratory, the fiber tear was 80% dry and 10% wet, with the bond strength being 140 lbs. and 67 lbs., respectively. In these tests the viscosity was about 6000 to 8000 centipoises.

Example 10

A blood silicate adhesive having the following composition in parts by weight was prepared:

|  | Parts |
| --- | --- |
| Type 2H hog blood | 25.6 |
| Type 2 beef blood | 6.4 |
| Milo starch (Globe 4001) | 19.2 |
| Kaolin clay (Hydrite R) | 9.6 |
| Sodium silicate (N) | 38.6 |
| Glyoxal (6% solution) | 2.56 |
| FA # antifoam | 0.3 |
| Sodium sulfite | 0.6 |
| Water | 128.0 |

The sulfite and the antifoam were first mixed with the water, then the blood mixture was added, and following this the starch, clay, silicate and glyoxal in succession. The viscosity was 600 cps. at both 1 hour and 4 hours after preparation.

A commercial plant scale run was made using conventional corrugating machinery and salable corrugated board was produced. Our adhesive was used only at the doubleback station. Hot plate steam pressure was 164 p.s.i., and paper basis weight was 42 lbs. for singleface liner, 27 lbs. for medium and 33 lbs. for doubleback liner. Speeds ranged from 125 to 425 f.p.m. The glue line held well at all speeds and developed a good fiber tear at the cut off with no evidence of brittleness. After conditioning at 73° F. and 50% relative humidity and after soaking in water for 24 hours the doublebacker bond strengths varied very little whether run at 125, 300 or 425. At 300 f.p.m. the doublebacker bond was 55 lbs. per linear foot dry strength and 95% tear; and 3.0 lbs. per foot wet bond strength and 90% tear.

Example 11

A corrugating adhesive was prepared with the following composition in parts by weight:

|  | Parts |
| --- | --- |
| Type 2 beef blood | 88.4 |
| Type 2H hog blood | 44.2 |
| Milo starch | 84.4 |
| "Furafil" | 45.0 |
| Sodium silicate (N) | 183.0 |
| Glyoxal (anhydrous) | 1.1 |
| Antifoam (FA #5) | 1.0 |
| Sodium sulfite | 2.2 |
| $H_2O$ | 560.0 |

The Furafil has an acid pH (about pH 2 in 10% solution) and neutralizes part of the alkali which would otherwise be excessive. The initial shear viscosity was 760 cp. and was still only 840 after five days. The Bauer cup flow viscosity was about 30 seconds at 24 hrs. and the gelation temperature was 48° C. It is possible to raise the gelation temperature to 52° C. or higher in similar adhesives.

Bonds made with this adhesive were very good.

Dry bond:
  Strength _____pounds__ 52
  Fiber tear _____percent__ 97
Wet bond:
  Strength _____pounds__ 7
  Fiber tear _____percent__ 95

USES

While this adhesive finds its primary use in the preparation of water-resistant corrugated paperboard boxes, by suitably varying the addition of fillers and other reactants to provide the necessary viscosity, tack and setting time, these or similar adhesive compositions may be used in paper tube and core winding, drum winding, solid fiber laminating, paper-wood laminates, plywood glues, foil laminating, coating and impregnating paper, bonding particle board, foundry core binders, etc.

We claim:
1. The method of preparing an adhesive composition which
   (a) is free of uncombined NaOH,
   (b) has a viscosity of 200–2000 centipoises, and
   (c) is suitable for the manufacture of corrugated paperboard,
said method consisting essentially of:
   (1) forming an aqueous reaction medium by the commingling of soluble dried blood, a soluble alkali silicate, and a dialdehyde selected from the group consisting of glyoxal and glutaraldehyde, and allowing interaction of the commingled ingredients to occur,
   (2) said alkali silicate being introduced into the aqueous reaction medium no later than the time that any interaction between said blood and said dialdehyde begins,
   (3) the alkali silicate being present in a ratio of between about 3 to 7 parts by weight of alkali silicate to about 5 parts by weight of soluble dried blood,
   (4) the dialdehyde being present in an amount equivalent to about 0.5 to 11 milliliters of a 40% glyoxal solution based on 100 milligrams of soluble dried blood,
   (5) recovering the resulting adhesive.

2. A method according to claim 1 wherein the weight of the alkali silicate and the weight of the soluble dried blood are approximately equal.

3. The method of claim 1 wherein the pH during the reaction is maintained within the range of about 9.9 and 11.4.

4. The method of claim 1 wherein the alkali silicate is sodium silicate and has a $Na_2O:SiO_2$ ratio between 2.4 and 3.8.

5. The method of claim 1 wherein the alkali silicate is sodium silicate and has a $Na_2O:SiO_2$ ratio between 3.0 and 3.5.

References Cited
UNITED STATES PATENTS

| | | | |
|---|---|---|---|
| 3,294,564 | 12/1966 | Karjala et al. | 106—135 |
| 3,301,692 | 1/1967 | Karjala et al. | 106—161 |

JAMES E. POER, Primary Examiner

U.S. Cl. X.R.

106—80, 84